Patented Dec. 23, 1930

1,785,801

UNITED STATES PATENT OFFICE

WERNER ZERWECK, OF FRANKFORT-ON-THE-MAIN-FECHENHEIM, GERMANY, ASSIGNOR TO GENERAL ANILINE WORKS INC., OF NEW YORK, N. Y., A CORPORATION OF DELAWARE

NEW BROWN VAT DYESTUFFS OF THE ANTHRAQUINONE SERIES

No Drawing. Application filed April 3, 1929, Serial No. 352,316, and in Germany April 2, 1928.

The present invention relates to new brown vat dyestuffs of the anthraquinone series.

I have found that valuable vat dyestuffs of the anthraquinone series are obtained by condensing amines of the anthracene series with 1-chloroanthraquinone-2-carboxylic acid. The process may be carried out practically by preparing at first the corresponding anthracyl-1-amino-anthraquinone-2-carboxylic acid and transforming it into the corresponding acridone, while splitting off water, or by transforming the anthracyl-1-aminoanthraquinone-2-carboxylic acid into the chloride and converting the latter into the acridone, while splitting off hydrochloric acid. But it is an advantage to produce the acridone in a single operation by condensing amino-anthracenes with 1-chloro-anthraquinone-2-carboxylic acid.

The new dyestuffs thus obtained correspond probably to the general formula:

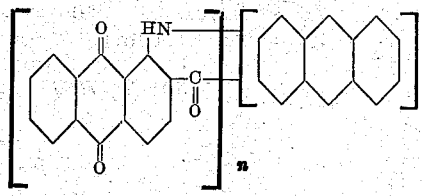

wherein $n$ means the number 1 or 2 and the anthracene as well as the anthraquinone nuclei may contain further substituents. The new dyestuffs are when dry brown powders, soluble in concentrated sulfuric acid with a brownish color. They dye the vegetable fiber from the hydrosulfite vat bright brown shades of an excellent fastness especially to light and to exposure. By this valuable tint they are distinguished from the acridones known hitherto, which are obtainable by condensing the 1-chloro-anthraquinone-2-carboxylic acid with amines of the benzene or naphthalene series, which dyestuffs yield orange to violet-red shades. The new dyestuffs which are the object of my present invention can be fixed on the fiber from a cold or hot vat.

In order to further illustrate my invention the following examples are given, the parts being by weight and all temperatures in centigrade degrees, but it may be understood that my invention is not limited to the particular products or reacting conditions mentioned therein.

EXAMPLE 1

A mixture of 60 parts of naphthalene, 5,7 parts of 1-chloroanthraquinone-2-carboxylic acid, 4,6 parts of β-anthramine and 3 parts of oxalic acid is heated for some hours in an apparatus provided with a reflux condenser. The mass is diluted while warm with ligroine, the precipitate is filtered off, well washed with ligroine, then with alcohol and a hot diluted solution of ammonia and dried. The dyestuff thus obtained corresponding probably to the formula:

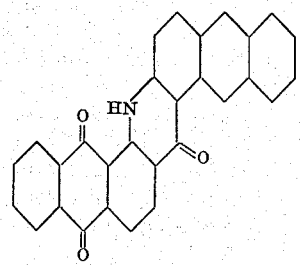

is a violet-brown powder, soluble in concentrated sulfuric acid with a dull brown color. It dyes the vegetable fiber from a bluish red vat reddish brown shades of an excellent fastness particularly to light and exposure.

EXAMPLE 2

When using instead of β-anthramine 2,1 parts of 2,6-diamino-anthracene and carrying out the condensation as described in Example 1, a diacridone is obtained corresponding probably to the formula:

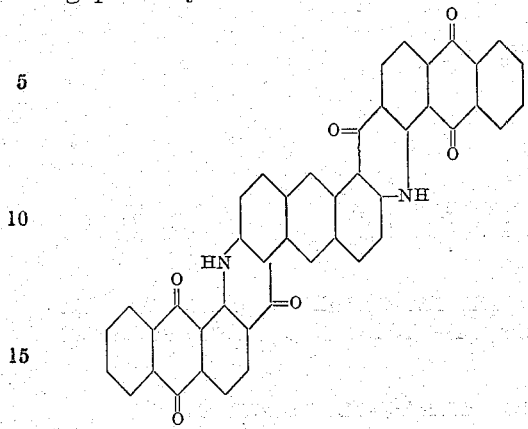

The new dyestuff represents when dry a reddish brown powder, soluble in concentrated sulfuric acid with a yellowish brown color. It dyes cotton from a warm bluish red hydrosulfite vat strong reddish brown shades of a good fastness especially to light.

EXAMPLE 3

(a) *Production of the β-anthracyl-1-amino-anthraquinone-2-carboxylic acid of the formula:*

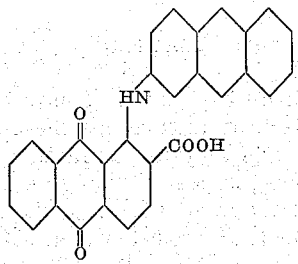

5,8 parts of 1-chloroanthraquinone-2-carboxylic acid and 3,9 parts of β-anthramine are mixed with 0,2 part of copper bronze and 40 parts of dimethylaniline and the mixture is heated for some hours to about 140–145°. When cool the mass is poured on diluted hydrochloric acid and the precipitate is filtered off and washed with water. For purification it may be dissolved in a hot dilute caustic soda solution and precipitated again by adding hydrochloric acid to the filtrated solution. The precipitate is filtered off, washed and dried.

(b) *Production of the acridone compound*

2,2 parts of the β-anthracyl-1-amino-anthraquinone-2-carboxylic acid obtained according to (a) are mixed with 45 parts of trichlorobenzene and 1,5 parts of phosphorus pentachloride and the mixture is heated on the water bath and then at about 200–210° for a short time. When cool the formed acridone compound is filtered off, washed with chlorobenzene and acetone. For purification it may be extracted with a dilute solution of carbonate of soda. The dyestuff, which is identical with that of Example 1, is thus obtained as a violet-brown powder.

When adding aluminiumchloride to the mass the transformation of the acid chloride into the acridone can be carried out in the cold.

I claim:

1. As new compounds vat dyestuffs corresponding probably to the general formula:

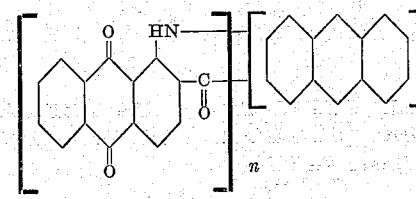

wherein $n$ means the number 1 or 2 and the anthracene as well as the anthraquinone nuclei may contain further substituents, which dyestuffs are when dry brownish powders soluble in concentrated sulfuric acid with a brownish color, dyeing the vegetable fiber from the hydrosulfite vat bright brown shades of an excellent fastness especially to light and exposure.

2. As a new compound the vat dyestuff corresponding probably to the formula:

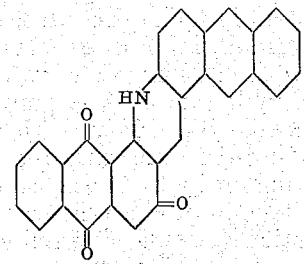

which dyestuff is when dry a violet-brown powder soluble in concentrated sulfuric acid with a brown color, dyeing the vegetable fiber from a bluish red hydrosulfite vat reddish brown shades of an excellent fastness especially to light and exposure.

In testimony whereof, I affix my signature.

WERNER ZERWECK.